(12) United States Patent
Price et al.

(10) Patent No.: US 8,854,549 B2
(45) Date of Patent: Oct. 7, 2014

(54) DUAL SLIDER BAR CONTROL

(75) Inventors: Pat William Price, Rhome Ranch, TX (US); Peter Jay Schwartz, Fullerton, CA (US)

(73) Assignee: Vizio, Inc., Irvine, CA (US)

( * ) Notice: Subject to any disclaimer, the term of this patent is extended or adjusted under 35 U.S.C. 154(b) by 818 days.

(21) Appl. No.: 12/512,286

(22) Filed: Jul. 30, 2009

(65) Prior Publication Data

US 2011/0025924 A1 Feb. 3, 2011

(51) Int. Cl.
*H04N 5/50* (2006.01)
*H04N 5/45* (2011.01)
*H04N 21/431* (2011.01)
*H04N 5/445* (2011.01)
*G06F 3/0484* (2013.01)
*H04N 21/443* (2011.01)
*H04N 21/422* (2011.01)
*H04N 21/485* (2011.01)

(52) U.S. Cl.
CPC ......... *H04N 21/485* (2013.01); *H04N 21/4312* (2013.01); *H04N 5/44513* (2013.01); *G06F 3/04847* (2013.01); *H04N 21/4438* (2013.01); *H04N 21/42204* (2013.01)

USPC .......................... 348/569; 348/563; 348/564

(58) Field of Classification Search
USPC ........................................... 348/564
See application file for complete search history.

(56) References Cited

U.S. PATENT DOCUMENTS

2005/0094014 A1* 5/2005 Haas et al. ............... 348/333.01

* cited by examiner

*Primary Examiner* — Jefferey Harold
*Assistant Examiner* — Michael Teitelbaum
(74) *Attorney, Agent, or Firm* — Law Office of Scott C. Harris, Inc.

(57) ABSTRACT

An application for a slider bar on a display has a series of ticks, each indicating one or more gradations of a parameter ranging between a minimum value and a maximum value. Two marker icons are on the display screen in relation to the ticks. A user control moves a first marker icon within a predetermined range of ticks. Once the first marker icon reaches an end of travel, if the end of travel is next the second marker icon, the first marker becomes inactive (remaining at its current location) and the second marker icon becomes the active marker icon, moving within a predetermined range for the second marker icon.

9 Claims, 4 Drawing Sheets

DUAL SLIDER BAR CONTROL

FIELD OF THE INVENTION

This invention relates to the field of television devices and more particularly to a dual slider bar user interface.

BACKGROUND OF THE INVENTION

There are many known ways to utilize various input devices along with on-screen displays to affect changes to parameters (e.g. volume, brightness) within a television or monitor. In the art of televisions, often a remote control device is provided as the input device. The remote control usually has some form of arrow keys and at least one select/enter key that is often used in conjunction with an on-screen slider bar to change parameters such as volume, contrast and brightness. In such, the slider bar includes a series of ticks representing a range of settings, either left to right or top to bottom. Each tick represents one or more granular steps between the minimum setting and the maximum setting of the associated parameter. There is a marking icon on the slider bar indicating the current setting of the associated parameter and, each press of the associated arrow key moves the marking icon one granular step in the direction of the arrow key, thereby changing the associated parameter. For example, if the volume slider bar is oriented horizontally, the each press of the left arrow key moves the marking icon left, thereby reducing the volume one gradation. Likewise, each press of the right arrow key moves the marking icon right, thereby increasing the volume one gradation.

For parameters that have a center (or preferred) value such as balance, fade (front/back), contrast, brightness; often the slider bar has a special mark, usually central to the slider bar, indicating such. The special mark is often similar to one of the ticks, only larger, and in some examples, the special mark includes two such larger ticks. This is used to show the user the default or central setting. In current user interfaces, the marking icon moves freely across the slider bar (e.g., if the arrow key is held down) without stopping at these special marks.

What is needed is an improved slider bar that provides a stopping point at one or more central or default positions to improve the user interface.

SUMMARY

The present invention includes a slider bar on a display screen having a series of ticks, each indicating one or more gradations of an associated parameter (e.g. balance, contrast, brightness) between a minimum value of the parameter and a maximum value of the parameter. At least two marker icons are on the display screen in relation to the ticks. A user control moves an active marker icon within a predetermined range of ticks. Once the active marker icon reaches an end of travel, if the end of travel is next to another marker icon, the active marker becomes inactive (remaining at its current location) and the next marker icon becomes the active marker icon, moving within a predetermined range for that marker icon.

In one embodiment, an on-screen slider control is disclosed including a slider bar having a first end and a second end and at least two marker icons in proximity to the slider bar. Each of the marker icons moves independently of the other marker icons responsive to signals from an input device.

In another embodiment, a method of controlling a parameter of a television is disclosed, the television having an input device and the input device having a first direction signal and a second direction signal. The method includes providing a default value for a parameter of a television and displaying a slider bar on a display panel of the television. The slider bar has a first end, a second end, a first marker icon and a second marker icon. Responsive to the first direction signal from the remote control, one of the first marker icon and the second marker icon moves toward the first end and responsive to the second direction signal, one of the first marker icon and the second marker icon moves toward the second end. The parameter is set based upon a current position of one of the first marker icon and the second marker icon.

In another embodiment, a method of controlling a parameter of a television is disclosed, the television having an input device with a left direction signal and a right direction signal. The method includes providing a default value for the parameter and displaying a slider bar on a display panel of the television. The slider bar has a left end, a right end, a left marker icon and a right marker icon. The left marker icon starts adjacent and left of a slider bar location associated with the default value and the right marker icon starting adjacent and right of the slider bar location associated with the default value. When the right marker icon is positioned adjacent and right of the slider bar location associated with the default value, the left marker icon moves towards the left end responsive to the left direction signal until the left marker icon is at the left end of the slider bar. When the right marker icon is not positioned adjacent and right of the slider bar location associated with the default value, the right marker icon moves towards the left end responsive to the left direction signal until the right marker icon is positioned adjacent and right of the slider bar location associated with the default value. When the left marker icon is positioned adjacent and left of the slider bar location associated with the default value, the right marker icon moves towards the right end responsive to the right direction signal until the right marker icon is at the right end of the slider bar. When the left marker icon is not positioned adjacent and left of the slider bar location associated with the default value, the left marker icon moves towards the right end responsive to the right direction signal until the left marker icon is positioned adjacent and left of the slider bar location associated with the default value. If the left marker icon is positioned adjacent and left of the slider bar location associated with the default value, the parameter is set based upon a current position of the right marker icon. Otherwise, the parameter is set based upon a current position of the left marker icon.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
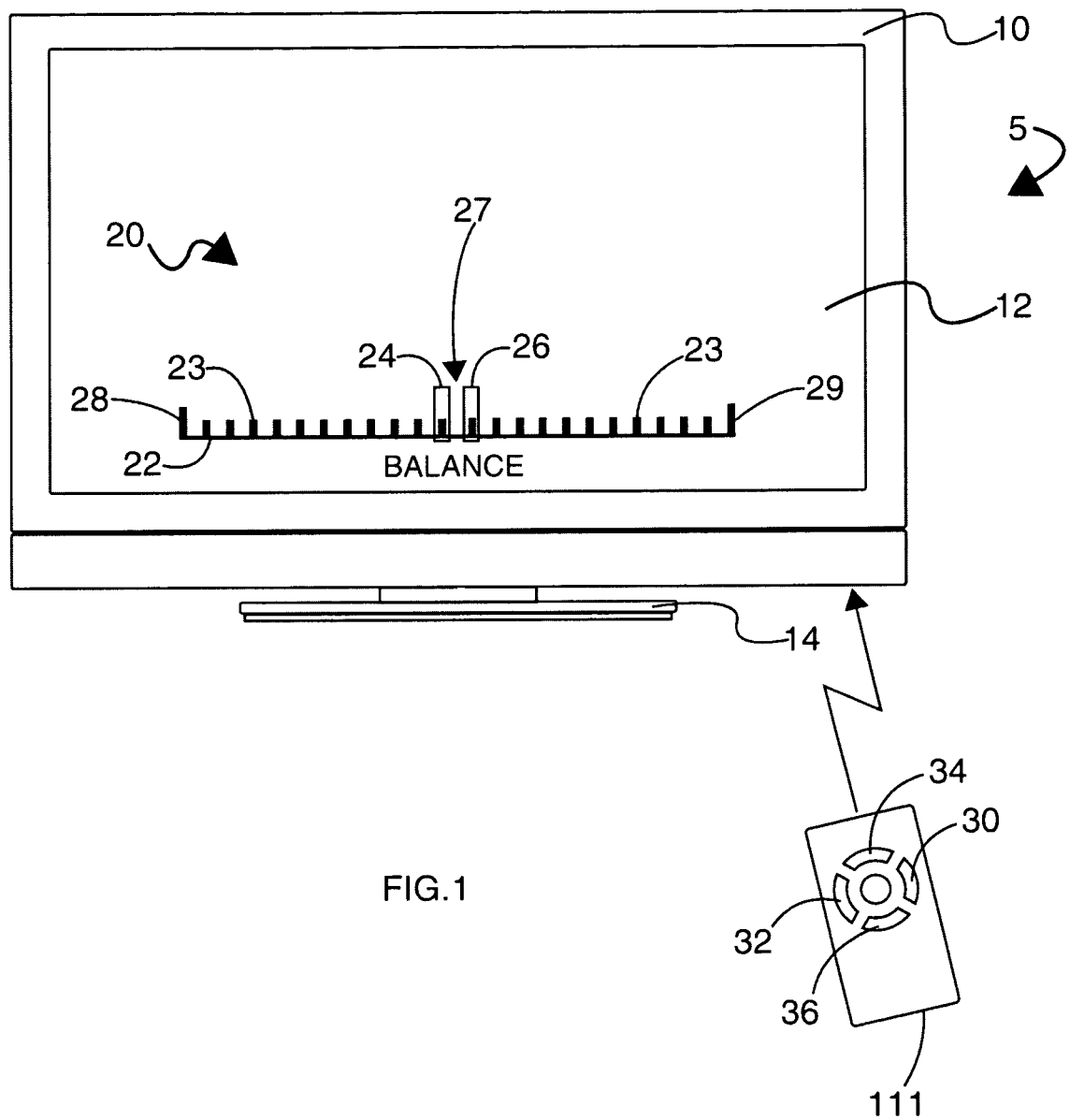
FIG. 1 illustrates a plan view of a television shown with an exemplary slider bar of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a plan view of a television 5 shown with an exemplary slider bar of the present invention will be described. The slider bar 22 is shown on a typical television or monitor 5 display panel 12 as known in the industry. For completeness the television 5 is shown with a bezel 10 around the display panel 12 and resting on a stand 14.

The slider bar 22 has a plurality of ticks 23. Each tick represents one or more gradations of an associated parameter, for example balance as shown in FIG. 1. The present invention is not limited to any particular parameter and many are anticipated including, but not limited to, volume, balance, brightness, contrast, base, treble, mid-range, horizontal position and vertical position. Associated with the slider bar 22 are two marker icons 24/26, although any number of marker icons 24/26 is anticipated. The marker icons 24/26 move along the slider bar 22 responsive to activation of a device on a remote control 111 (e.g. arrow key, mouse movement-drag). For example, when a the left arrow key 32 is pressed, the remote 111 emits a left directional signal and one of the marker icons 24/26 moves left one gradient and when a right arrow key 30 is pressed, the remote 111 emits a right directional signal and one of the marker icons 24/26 moves right one gradient. It is anticipated that each tick 23 represents one or more gradients such that the left/right movement of the marker icons 24/26 is either one tick 23 if each tick represents one gradient or partially between ticks 23 if each tick represents more than one gradient. The left 28 (or bottom) location of the slider bar 28 represents the minimum value for the parameter and the right 29 (or top) location of the slider bar 29 represents the maximum value for the parameter.

Figure 2:
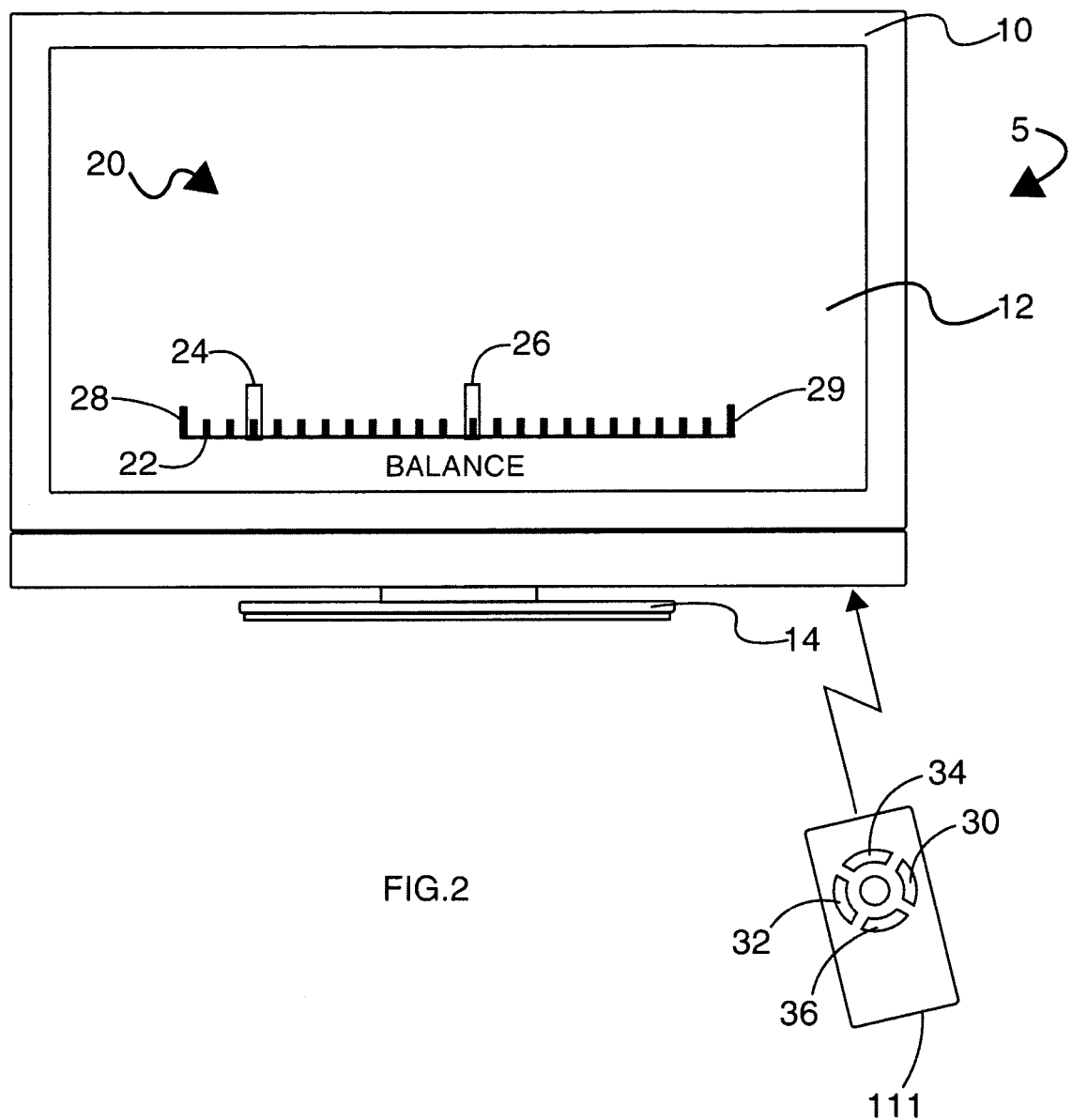
FIG. 2 illustrates a plan view of a television shown with an exemplary slider bar of the present invention.
Figure 3:
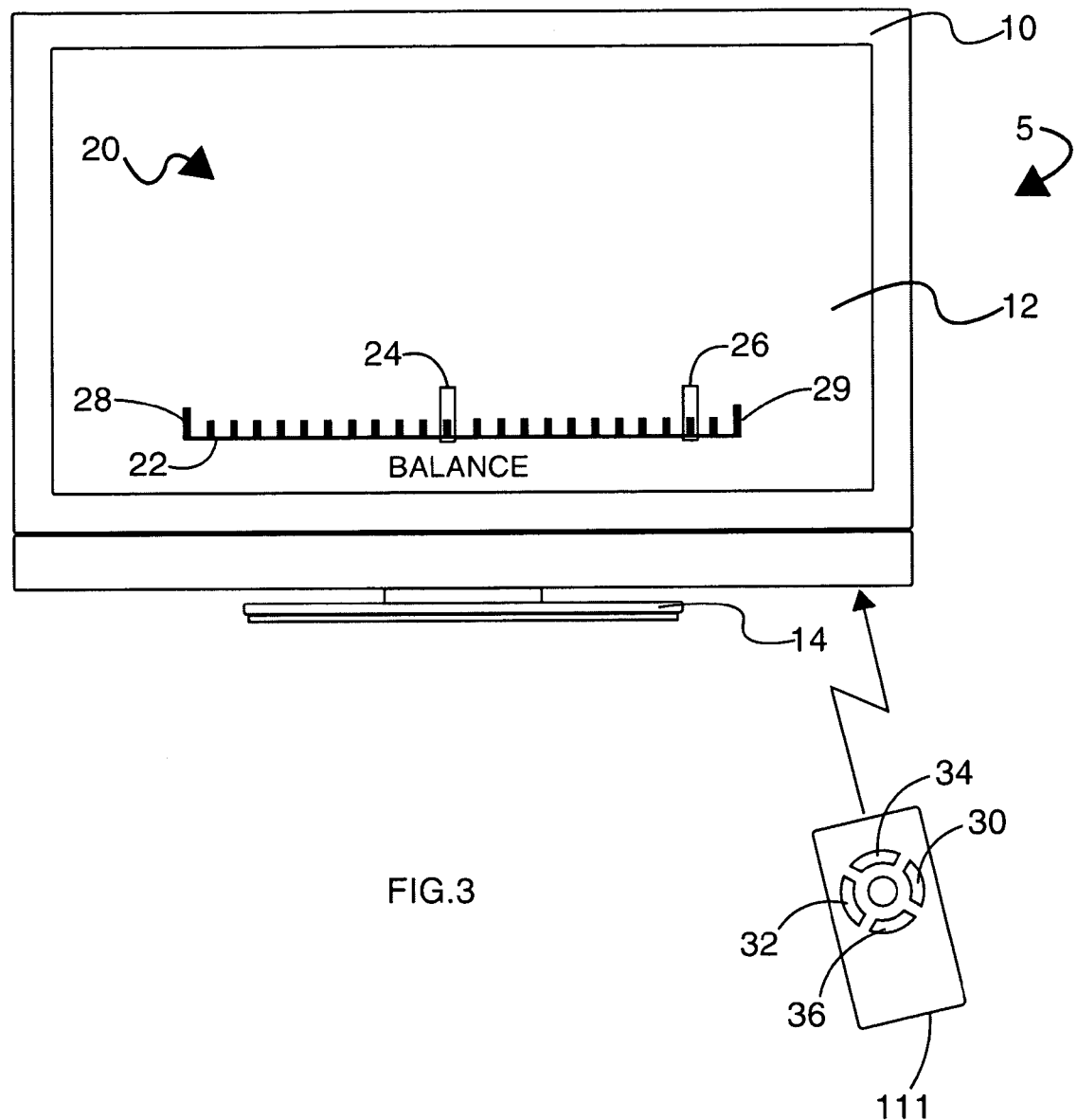
FIG. 3 illustrates a plan view of a television shown with an exemplary slider bar of the present invention.

In the present example, movement left/right of each marker icon 24/26 is restricted. The left marker icon 24 is restricted by the left end 28 of the slider bar 22 and a predetermined position 27 of the slider bar 22. The right marker icon 24 is restricted by the right end 29 of the slider bar 22 and the predetermined position 27 of the slider bar 22. From the starting point shown in FIG. 1, pressing of the left arrow button 32 (or equivalent) moves the left marker icon 24 left one gradient and pressing of the right arrow button 30 (or equivalent operation) moves the right marker icon 26 one gradient to the right. Operation of the left marker icon 24 is shown in FIG. 2 and operation of the right marker icon 26 is shown in FIG. 3. The predetermined position 27 typically represents a default value for the parameter and/or a median value for the parameter.

The examples shown in FIGS. 1-3 have two marker icons 24/26 and the slider bar 22 is oriented horizontally. It is fully anticipated that, in some user interfaces, other orientations of slider bars 22 (e.g. vertical slider bars 22) are used and, in such, other remote control operations such as the up arrow 34 and down arrow 36 effect movement of the marker icons 24/26 (see FIG. 4). It is also anticipated that more than two marker icons 24/25/26 are present such as that described in FIG. 4.

Referring to FIG. 2, a plan view of a television shown with an exemplary slider bar of the present invention will be described. In this, the left arrow key 32 has been pressed a number of times, therefore moving the left marker icon 24 left between the left end 28 and predetermined position 27 of the slider bar 22. In such, the parameter (e.g. balance) is set to a value associated with the position of the left marker icon 24. As the right arrow key 30 is pressed, the left marker icon 24 moves right until it reaches the predetermined position 27 at which time it stops and the right marking icon 26 takes over. In a preferred embodiment, if the right arrow key 30 is held down, continuously sending commands, the left marker icon 24 moves right and stops at the predetermined position 27 until the right arrow key 30 is released, at which time, a subsequent operation of the right arrow key 30 then moves the right marker icon 26.

Referring to FIG. 3, a plan view of a television shown with an exemplary slider bar of the present invention will be described. In this, the right arrow key 30 has been pressed a number of times, therefore moving the right marker icon 26 right between the predetermined position 27 and the right end 28 of the slider bar 22. In such, the parameter (e.g. balance) is set to a value associated with the position of the right marker icon 26. As the left arrow key 32 is pressed, the right marker icon 26 moves left until it reaches the predetermined position 27 at which time it stops and the left marking icon 24 takes over. In a preferred embodiment, if the left arrow key 32 is held down, continuously sending commands, the right marker icon 26 moves left and stops at the predetermined position 27 until the left arrow key 32 is released, at which time, a subsequent operation of the left arrow key 32 then moves the left marker icon 24.

Figure 4:
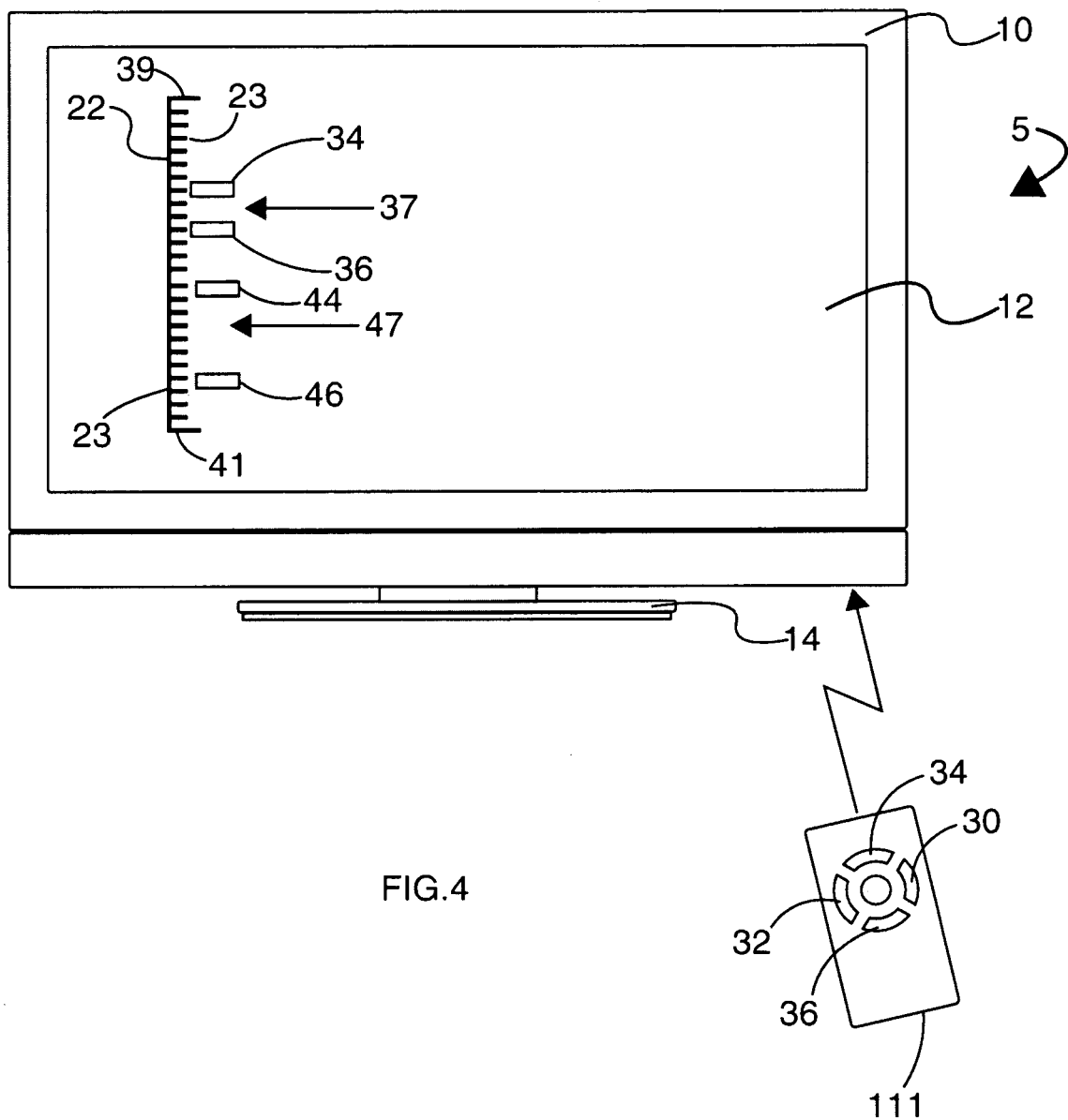
FIG. 4 illustrates a plan view of a television shown with an exemplary slider bar of the present invention.

Referring to FIG. 4, a plan view of a television shown with an exemplary slider bar with an exemplary slider bar of the present invention will be described. The slider bar 22 is shown on a typical television or monitor 5 display panel 12 as known in the industry. For completeness the television 5 is shown with a bezel 10 around the display panel 12 and resting on a stand 14.

In this example, the slider bar 22 is oriented vertically and has a plurality of ticks 23. Each tick represents one or more gradations of an associated parameter. The present invention is not limited to any particular parameter and many are anticipated including, but not limited to, volume, balance, brightness, contrast, base, treble, mid-range, frequency ranges of a graphics response control, horizontal position and vertical position. Associated with the slider bar 22 are four marker icons 34/36/44/46, although any number of marker icons 34/36/44/46 is anticipated. The marker icons 34/36/44/46 move along the slider bar 22 responsive to activation of a device on a remote control 111 (e.g. arrow key, mouse movement-drag). For example, when a the up arrow key 34 is pressed, one of the marker icons 34/36/44/46 moves up one gradient and when a down arrow key 36 is pressed, one of the marker icons 24/26 moves down one gradient. It is anticipated that each tick 23 represents one or more gradients such that the up/down movement of the marker icons 34/36/44/46 is either one tick 23 if each tick represents one gradient or partially between ticks 23 if each tick represents more than one gradient.

In the present example, movement up/down of each marker icon 34/36/44/46 is restricted. There are two pairs of marker icons 34/36/44/46. The first pair 34/36 operates around a first predetermined position 37 of the slider bar 22 and the first pair 44/46 operates around a first predetermined position 47 of the slider bar 22. The top marker icon 34 of the first pair 34/36 is restricted by the right top end 39 of the slider bar 22 and the first predetermined position 37 of the slider bar 22. The bottom marker icon 36 of the first pair 34/36 is restricted by the first predetermined position 37 of the slider bar 22 and the top marker icon 44 of the second pair 44/46. The top marker icon 44 of the second pair 44/46 is restricted by the first predetermined position 37 of the slider bar 22 and the second predetermined position 37 of the slider bar 22. The bottom marker icon 46 of the second pair 44/46 is restricted by the second predetermined position 47 of the slider bar 22 and the top bottom end 41 of the slider bar. The bottom marker icon 46 of the second pair 44/46 is shown in a position in which it has already moved downward several ticks 23. In some embodiments, multiple marker icon pairs 34/36/44/46 setting of provide multiple parameters with one slider bar 22. For example, the top marker icon pair 34/36 of this example adjusts base and the bottom marker icon pair 44/46 adjusts treble.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of controlling a parameter of a television, the method comprising:
   providing a default value for a parameter of a television, the television receiving signals from an input device and the signals including a left direction signal and a right direction signal;
   displaying a slider bar on a display panel of the television, the slider bar having a left end, a right end, a left marker icon and a right marker icon;
   responsive to receiving the left direction signal, moving the left marker icon towards the left end, if the control is currently in a left range between said default value and said left end while not moving the right marker icon when the control is in said left range responsive to receiving the left direction signal and moving the right marker icon toward the left end if the control is currently in a right range between said default value and said right end, while not moving the moving the left marker icon when said control is in said right range responsive to receiving the left direction signal;
   responsive to the right direction signal, moving the left marker icon towards the right end if the control is currently in said left range while not moving the right marker icon responsive to receiving the right direction signal, and moving the right marker icon toward the left end if the control is currently in said right range while not moving the left marker icon responsive to receiving the right direction signal; and
   setting the parameter based upon a current position of said left marker icon when said left marker icon is in said left range, and not based on the right marker icon when said left marker icon is in said left range and setting the parameter based on the current position of the right marker icon when said right marker icon is in said right range and not based on the left marker icon when the right marker icon is in said right range, wherein said right direction signal causes said left marker icon that is to the left of said default value to move right until said left marker icon reaches the default value, at which time said left marker icon stops moving, and at which time said right marker icon starts moving responsive to said right direction signal being selected; and
   where said right marker icon stops moving at said default value for the parameter while when the left direction signal is being received; and said left marker icon stops moving at said default value for the parameter while the right direction signal is being received.

2. The method of claim 1, wherein a default location on the slider bar corresponds to the default value and the left marker icon is initially positioned on a left side of the default location and the right marker icon is initially positioned on a right side of the default location.

3. The method of claim 2, wherein the left marker icon moves between the left end of the slider bar and the left side of the default location and the right marker icon moves between the right side of the default location and the right end of the slider bar.

4. The method of claim 3, wherein the slider bar is oriented horizontally and the left end is the left end of the slider bar, the right end is the right end of the slider bar, the left side of the default location is left of the default location and the right side of the default location is right of the default location.

5. The method of claim 4, wherein the left direction signal is a left directional signal and when the right marker icon is at the right side of the default location, moving the left marker icon in a left direction responsive to the left direction signal but not past the left end; and when the right marker icon is not at the right side of the default location, moving the right marker icon in the left direction responsive to the left direction signal but not past the right side of the default location.

6. The method of claim 4, wherein the right direction signal is a right directional signal and when the left marker icon is at the left side of the default location, moving the right marker icon in a right direction responsive to the right direction signal but not past the right end; and when the left marker icon is not at the left side of the default location, moving the left marker icon in the right direction responsive to the right direction signal but not past the left side of the default location.

7. An apparatus for controlling a parameter of a television, comprising:
   a television, having a processor and a display screen, display a default value for a parameter of a television, the television receiving a signal from an input device and the signals including a left direction signal and a right direction signal;
   said television operating for displaying a slider bar on a display panel of the television, the slider bar having a left end, a right end, a left marker icon and a right marker icon, and responsive to receiving the left direction signal, moving the left marker icon towards the left end, if the control is currently in a left range between said default value and said left end while not moving the right marker icon when the control is in said left range responsive to receiving the left direction signal and moving the right marker icon toward the left end if the control is currently in a right range between said default value and said right end, while not moving the moving the left marker icon when said control is in said right range responsive to receiving the left direction signal;
   and said television operating responsive to the right direction signal, moving the left marker icon towards the right end if the control is currently in said left range while not moving the right marker icon responsive to receiving the right direction signal, and moving the right marker icon toward the left end if the control is currently in said right range while not moving the left marker icon responsive to receiving the right direction signal; and
   said television setting the parameter based upon a current position of said left marker icon when said left marker icon is in said left range, and not based on the right marker icon when said left marker icon is in said left range and setting the parameter based on the current position of the right marker icon when said right marker icon is in said right range and not based on the left marker icon when the right marker icon is in said right range, wherein said right direction signal causes said left marker icon that is to the left of said default value to move right until said left marker icon reaches the default value, at which time said left marker icon stops moving, and at which time said right marker icon starts moving responsive to said right direction signal being selected, and where said right marker icon stops moving at said default value for the parameter while when the left direction signal is being received; and said left marker icon stops moving at said default value for the parameter while the right direction signal is being received.

8. The apparatus of claim 7, wherein the slider bar further comprises ticks and the ticks represent one or more gradations of values between a minimum value of the parameter associated with the slider bar and a maximum value of the parameter associated with the slider bar.

9. The apparatus of claim 7, wherein the left marker icon and the right marker icon are represented as rectangles displayed near the slider bar.

* * * * *